March 25, 1952  K. J. ALWARD  2,590,144
HYDRAULIC ACTUATOR
Filed Aug. 14, 1948  2 SHEETS—SHEET 1
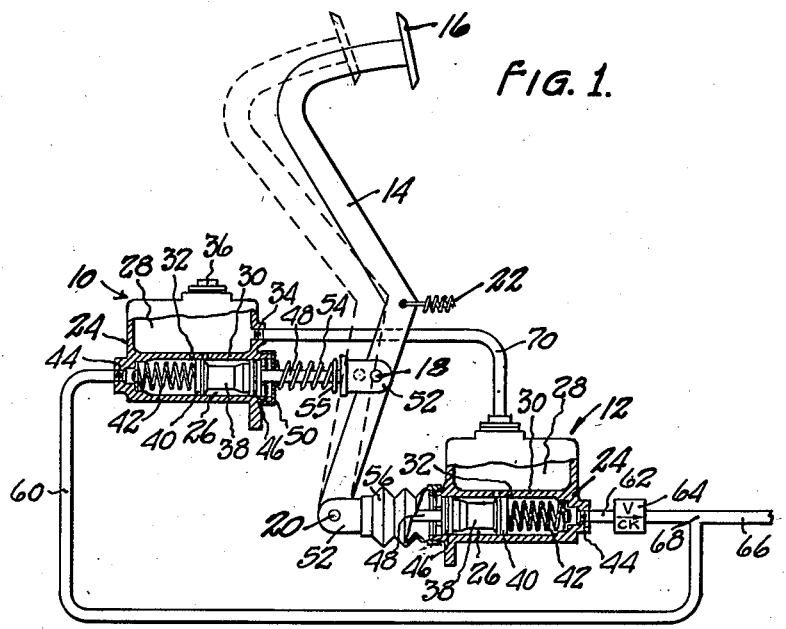
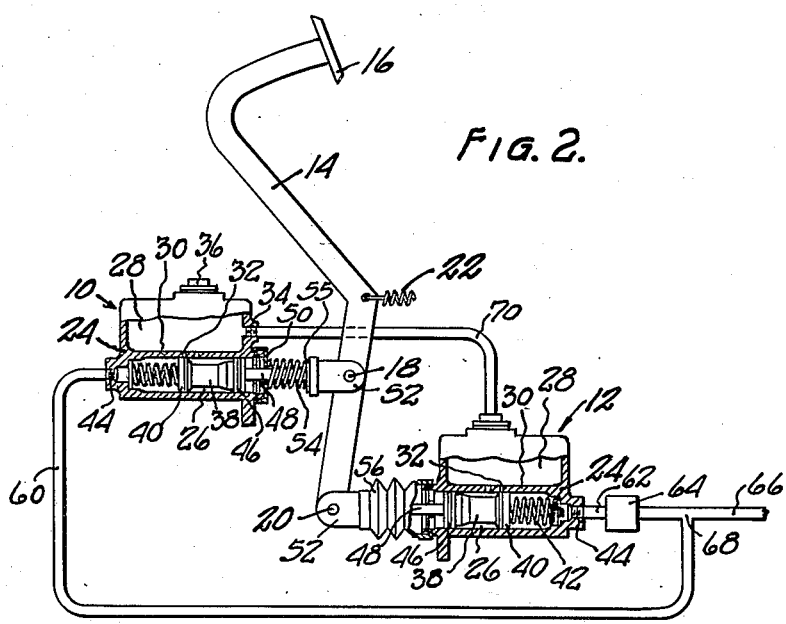
INVENTOR.
KENNETH J. ALWARD.
BY
ATTORNEYS.

Patented Mar. 25, 1952

2,590,144

UNITED STATES PATENT OFFICE 2,590,144

HYDRAULIC ACTUATOR

Kenneth J. Alward, South Bend, Ind.

Application August 14, 1948, Serial No. 44,265

2 Claims. (Cl. 60—54.6)

1

This invention relates to improvements in hydraulic actuators, and more particularly to a device for operating the hydraulic brakes of automobiles and trucks.

The primary object of the invention is to provide a device for multiplying by leverage the force applied by a brake pedal or other actuator in order to obtain a high value of fluid displacement and fluid pressure from a small actuating movement effected through the application to the pedal or other actuator of a small actuating pressure.

A further object is to provide a device of this character wherein two master cylinders are employed and an actuator is pivotally connected thereto at spaced points so that the actuator has a floating movement and action and its fulcrum is free to change from the point of connection thereof with one master cylinder to the point of connection thereof with the other master cylinder during its operating stroke as the resistances of the master cylinders vary in use.

Other objects will be apparent from the following specification.

In the drawing:

Fig. 1 is a side view of the device with parts shown in section illustrating in dotted lines the initial movement of the brake pedal or other actuator from its resting position.

Fig. 2 illustrates the position assumed by the parts upon further movement of the pedal from the dotted line position shown in Fig. 1.

Figure 3:
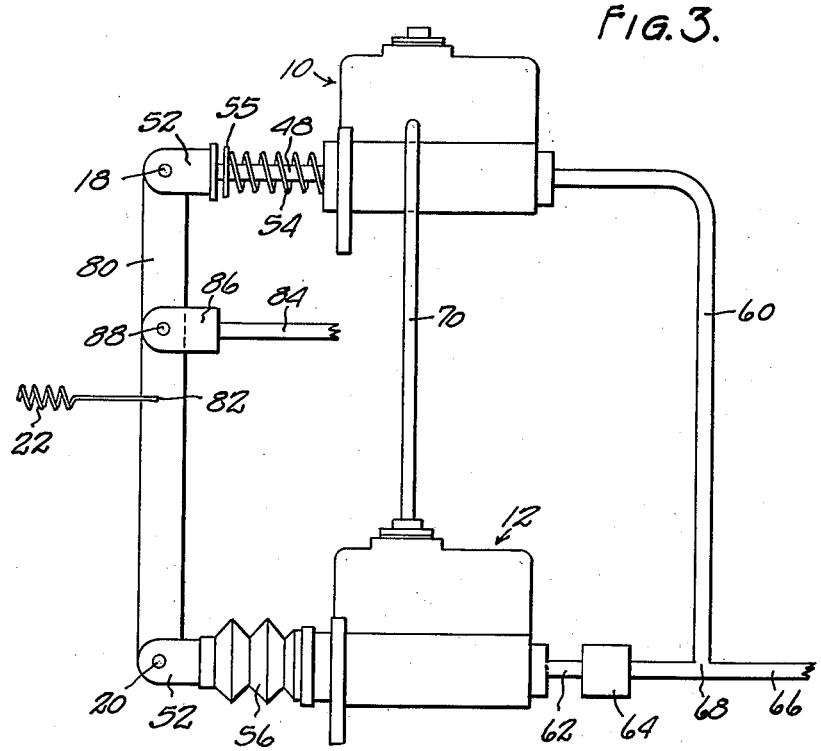
Fig. 3 is a view illustrating an alternative embodiment of the invention.

Referring to the drawings, and particularly to Figs. 1 and 2 thereof, the numeral 10 designates a master cylinder and the numeral 12 a second master cylinder. The cylinders 10 and 12 are suitably mounted upon the frame of an automotive vehicle or truck in the manner well understood in the art. The numeral 14 designates a foot pedal although it will be understood that any other type of actuator may be employed. The foot pedal has a foot plate 16 at its upper end and is pivotally connected at 18 to the master cylinder 10 and at 20 to the master cylinder 12. The pedal or other actuator is normally urged to the full line position illustrated in Fig. 1 by a spring 22.

Each of the master cylinders may be of any conventional construction and is of the character well understood in the art. As illustrated herein, each of the cylinders comprises a housing 24 having a cylindrical bore 26 therein and a reservoir chamber 28, said cylinder and chamber being separated by a wall 30 which is provided with one or more ports establishing communication between the cylinder and the chamber and including the pressure compensating port 32. The housing 24 is preferably constructed to have two or more ports therein. As here illustrated, these housings may have a port 34 at one end thereof and a port in its top adapted to be closed by a plug 36, as herein shown in Fig. 1 with respect to cylinder 10.

A piston spool 38 is mounted in the cylinder 26 and is provided at its inner end with an enlarged portion mounting a seal 40 which is preferably cup-shaped to be sealed upon application of pressure at its concave face and to permit reverse flow of liquid therepast. A coil spring 42 bears against the inner end of the piston at one end and against the housing at its opposite end. A port 44 is formed in one end of the cylinder facing the end of the piston spool which mounts the seal 40. The opposite or outer end of the spool 38 is enlarged and mounts a seal 46. The piston spool has a stem 48 which projects through an opening in an end cap 50 closing the end of the cylinder. A clevis 52 is mounted on the outer end of the stem 48. In the construction illustrated, the master cylinder 10 preferably has a coil spring 54 encircling the piston stem 48 and bearing at one end against the cap 50. The opposite end of the coil spring mounts a stop 55 which is slidable relative to the piston stem 48. The coil spring 54 is of such length that when the parts are in the normal or inoperative position shown in full lines in Fig. 1, the coil spring 54 will be extended fully and the stop 55 will be positioned spaced from the clevis 52. The master cylinder 12 is illustrated as provided with a collapsible bellows 56 encircling the stem 48 and connected at its opposite ends to the cap 50 and the clevis 52. The pivot point 18 may constitute a pin connecting the clevis 52 of the cylinder unit 10 to the pedal 14 or other actuator, and the pivot 20 may constitute a pivot pin connecting the clevis 52 of the cylinder 12 to the pedal.

A conduit 60 is connected at one end to the outlet port 44 of the cylinder chamber 26 of the cylinder unit 10, and a conduit 62 is connected to the outlet port 44 of the cylinder unit 12. The conduit 62 is connected with a check valve 64, and a conduit 66 leads from said check valve. The conduit 60 communicates with the conduit 66 at a junction 68. The port 34 of the reservoir chamber 28 of the cylinder unit 10 is connected by conduit 70 with the reservoir chamber 28 of the cylinder unit 12.

In the connection and arrangement of the parts, the positioning relation between the pivots 18 and 20 and the length of the pedal 14 is important. Thus it will be observed that the spacing between the pivots 18 and 20 is less than the spacing between the foot plate 16 and the pivot 18. The ratios between these dimensions is so correlated with the resistances of the two cylinder units 10 and 12 and of the spring 22 that when force is applied to the pedal or other actuator 14, as at the foot plate 16, that pedal or actuator is first caused to move from the full line position to the dotted line position in Fig. 1. For this purpose, the master cylinder 12 is selected to have a greater inherent resistance than the master cylinder 10. Consequently, during this initial movement, the pivot point 20 serves as the fulcrum of the pedal or other actuator because of this resistance ratio and because the spacing between the pivots 18 and 20 is less than the spacing between pivot 18 and the foot plate 16. The movement of the pedal to the dotted line position in Fig. 1 continues until the seal 40 of the piston 38 passes and closes the compensating port 32 between the cylinder bore and the reservoir chamber 28 of the unit 10. At this position, the clevis abuts the stop 55, so that the resistance of spring 54 is first brought into play.

Thereafter, continued movement of the actuator in the same direction will cause the pedal or actuator 14 to pivot about the point 18 as a fulcrum by reason of the fact that the resistance of spring 54 added to the inherent resistance of cylinder 10 produces a total resistance greater than the inherent resistance of cylinder 12. The resultant actuation of the piston of the cylinder 12 will force fluid from that cylinder into a fluid pressure line and past the check valve 64 for movement into the pressure responsive cylinders (not shown) for actuating the wheel brakes (not shown). Continued movement of the brake pedal to increase the pressure applied at the wheel brakes proceeds with the pivot 18 as a fulcrum until the resistance of the cylinder unit 12 increases to a value exceeding the value of the combined resistance of the spring 54 and the cylinder unit 10 in the leverage system, whereupon the fulcrum of the pedal or other actuator is transferred to the pin 20, and continued pedal operation or depression causes the piston 38 of the cylinder unit 10 to be further actuated. As the latter action occurs, fluid expelled from the unit 10 and passing through the conduit 60 is directed through the line 66 to the brakes by virtue of the interposition of the check valve 64 between the junction 68 of the conduits 60 and 66 and the outlet port 44 of the cylinder unit 12. Inasmuch as the master cylinder 10 has a high leverage ratio, it is capable of producing high hydraulic pressures upon the application of a minimum amount of force upon the actuator or pedal 14.

As soon as the actuating force is released from the foot pedal or other actuator, the pull of the return spring 22 coupled with the action of the springs of all of the hydraulic units, such as the springs 42 and 54, acts to return the actuator to the full line position shown in Fig. 1. Upon return of the pedal to its normal or inoperative position the compensating ports 32 of the two cylinder units are uncovered to reestablish communication between the reservoirs 28 and the cylinder bores 26 of said units. In this connection it will be observed, however, that flow in the system cannot occur directly from line 66 into the cylinder unit 12 because of the interposed check valve 64. Therefore, the initial flow upon return extends through the conduit 60 into the cylinder bore 26 of the cylinder unit 10. When the compensating port 32 of this cylinder unit is opened, the liquid may flow therethrough into the reservoir 28 of the unit 10 and thence through the conduit 70 into the reservoir 28 of the cylinder unit 12.

The embodiment illustrated in Fig. 3 employs parts of substantially the same construction above described, and similar parts bear the same reference numerals. In this embodiment the clevis 52 of the cylinder unit 10 is pivotally connected at 18 at one end of a rigid lever or link 80 whose opposite end is pivoted at 20 to the clevis 52 of the cylinder unit 12. At substantially the mid-point 82 of said link the return spring 22 is connected thereto to pull upon the same in a direction to move the pistons of the two piston units to their inoperative or normal position illustrated in Fig. 1. The actuator 84, which may be connected to a foot pedal or any other suitable device which is adapted to move in the direction of the arrow upon movement from its normal or inoperative position, has a clevis 86 mounted thereon which is pivotaly connected to the link 80 at 88. As here illustrated, spacing between the pivot points 52 and 88 is less than the spacing between the pivot points 20 and 88.

The arrangement of spring 54 upon the piston stem of cylinder 10, arranged for that limited stem movement which is necessary to close the compensating port 32 before the compression of said spring commences, is used in this embodiment also. The sequence of operation of the cylinder units 10 and 12 during movement of the actuator 84 in the direction of the arrow is the same as that described above. More specifically, the initial movement of the actuator 84 causes the link 80 to swing about the pivot 20 as a fulcrum until the movement of the piston of the cylinder unit 10 has closed the compensating port 32 therein and the compression of spring 54 commences. Thereafter, when the resistance of cylinder 10 is increased due to the fact that the resistance of spring 54 comes into play, the lever is caused to fulcrum about pivot point 18 to permit actuation of the piston of the cylinder unit 12. Subsequent operation in actuating direction causes the fulcrum point of the link 80 to change from one to the other of the two pivot points 18 and 20 as the resistances of the cylinder units vary one relative to the other.

In both forms of the device illustrated, the same advantages of a floating action finding its own fulcrum as the resistance values of the actuated parts vary, and of the increase in the fluid pressure applicable per unit of movement of the actuator, are realized. In other words, the principle of operation of the two embodiments is the same, and in each the pressure required to be applied manually to the actuator to achieve a given braking result is reduced, compared to the pressure required to actuate previous brake operating devices. Likewise, the stroke of the pedal or other actuator is reduced, compared to the stroke of other actuating devices.

While the preferred embodiments of the invention have been illustrated and described herein, it will be understood that changes may be made in the construction within the scope of the appended claims without departing from the spirit of the invention.

I claim:

1. A brake operating device comprising a pair of master cylinder units each having a cylinder, a piston reciprocable therein and a reservoir communicating with the cylinder through a compensating port while the piston is at an inoperative position; a pair of pressure outlet lines connected with said cylinders and with a pressure transmitting line; an actuator including a rigid member spring-urged to inoperative position and pivotally connected at spaced points to said pistons and having a point of pressure application unequally spaced from said pivot connections whereby pressure is applied to said pistons unequally, said actuator including an elongated member having actuating pressure applied at one end thereof and said pivot connections at its opposite end spaced apart longitudinally a distance less than the spacing of the inner pivotal connection from the pressure applying end thereof.

2. A brake operating device comprising a pair of master cylinder units each having a cylinder, a piston reciprocable therein and a reservoir communicating with the cylinder through a compensating port while the piston is at an inoperative position; a pair of pressure outlet lines connected with said cylinders and with a pressure transmitting line; an actuator including a rigid member spring-urged to inoperative position and pivotally connected at spaced points to said pistons and having a point of pressure application unequally spaced from said pivot connections whereby pressure is applied to said pistons unequally, said actuator constituting a foot pedal, said units being adapted to be fixedly mounted and said pivot connections between said pedal and units forming the sole support of said pedal whereby the fulcrum of the pedal will depend upon the relative resistances of said units at all points throughout the stroke of the pedal.

KENNETH J. ALWARD.

REFERENCES CITED

The following references are of record in the file of this patent:

UNITED STATES PATENTS

| Number | Name | Date |
| --- | --- | --- |
| 1,828,679 | Pieper | Oct. 20, 1931 |
| 1,921,008 | Shinn | Aug. 8, 1933 |
| 2,247,827 | Wegmann | July 1, 1941 |
| 2,263,263 | Dodge | Nov. 18, 1941 |
| 2,328,685 | Schnell | Sept. 7, 1943 |
| 2,341,318 | Forbes | Feb. 8, 1944 |

FOREIGN PATENTS

| Number | Country | Date |
| --- | --- | --- |
| 348,691 | Great Britain | May 15, 1931 |
| 782,865 | France | Mar. 25, 1935 |